United States Patent
Song

(10) Patent No.: US 6,850,290 B1
(45) Date of Patent: Feb. 1, 2005

(54) THIN FILM TRANSISTOR-LIQUID CRYSTAL DISPLAY AND METHOD FOR FABRICATING THE SAME

(75) Inventor: In Duk Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/443,507

(22) Filed: Nov. 19, 1999

Related U.S. Application Data

(62) Division of application No. 08/877,621, filed on Jun. 18, 1997, now Pat. No. 6,038,002.

(30) Foreign Application Priority Data

Jul. 13, 1996 (KR) .......................................... 96/28337

(51) Int. Cl.[7] .............................................. G02F 1/1368
(52) U.S. Cl. ........................ 349/43; 349/106; 349/110; 349/138; 349/187
(58) Field of Search .......................... 349/43, 106, 110, 349/111, 122, 123, 138, 187, 139, 42; 257/59, 72; 438/30

(56) References Cited

U.S. PATENT DOCUMENTS

| | | | |
|---|---|---|---|
| 5,327,001 A | * | 7/1994 | Wakai et al. ................ 257/350 |
| 5,426,523 A | * | 6/1995 | Shimada et al. ............ 349/111 |
| 5,446,562 A | * | 8/1995 | Sato ............................ 359/59 |
| 5,552,909 A | * | 9/1996 | Onisawa et al. .............. 359/59 |
| 5,626,796 A | * | 5/1997 | Tsujimura et al. .......... 252/582 |
| 5,894,360 A | | 4/1999 | Teshirogi .................... 349/122 |

* cited by examiner

Primary Examiner—Toan Ton
Assistant Examiner—Tai Duong
(74) Attorney, Agent, or Firm—Finnegan, Henderson, Farabow, Garrett & Dunner, L.L.P.

(57) ABSTRACT

A TFT-LCD taken along a horizontal line in a data line and a fabricating method thereof are disclosed. The TFT-LCD includes an insulating layer formed on a bottom plate, a data line formed on a predetermined area of the bottom plate, a protective layer formed on the data line and the bottom plate, a pixel electrode formed on the protective layer over an edge portions of the data line, a top plate overlapping the data line formed over the bottom plate, a color filter layer formed to overlap the data line formed on the bottom plate, a common electrode formed on the color filter layer, and an orientation layer formed on the common electrode.

12 Claims, 13 Drawing Sheets

THIN FILM TRANSISTOR-LIQUID CRYSTAL DISPLAY AND METHOD FOR FABRICATING THE SAME

This is a division of application Ser. No. 08/877,621, filed Jun. 18, 1997, now U.S. Pat. No. 6,038,002, issued Mar. 14, 2000, the contents of which are hereby incorporated by reference.

BACKGROUND OF THE INVENTION

1. Field of the Invention

The present invention relates to a thin film transistor liquid crystal display (TFT-LCD) and, more particularly, to a TFT-LCD in which a pixel electrode and a black matrix are configured to provide an increased aperture ratio and a method for fabricating the same.

2. Discussion of the Related Art

Generally, a TFT-LCD includes a bottom plate having a plurality of pixel regions arranged thereon in a matrix pattern. Each pixel includes one thin film transistor (TFT) coupled to a pixel electrode. The TFT-LCD further includes a top plate having a color filter and a common electrode formed thereon. The top and bottom plates are spaced relatively close to each other and a liquid crystal material is injected between the top plate and bottom plate. Polarizers are then respectively attached to the outer surfaces of the top and bottom plates.

In the conventional TFT-LCD described as above, the vertical crosstalk may become greater than the horizontal crosstalk when the TFT-LCD is driven in accordance with a line inversion method.

A conventional TFT-LCD will be described in detail below with reference to the accompanying drawings. FIG. 1 is a plan view of a conventional TFT-LCD, and FIGS. 2a and 2b are cross-sectional views taken along lines I—I and II—II, respectively, of FIG. 1.

As shown in FIG. 1, a plurality of horizontally extending gate lines 23a intersect a plurality of vertically extending data lines 25. A pixel electrode 27 is further provided having an edge portion overlapping gate lines 23a. A pixel electrode 27 is also spaced from data line 25 by a predetermined distance. A black matrix (BM) 16 is disposed covering the data line 25 and a predetermined portion of the gate line 23a.

As shown in FIG. 2a taken along line I—I of FIG. 1, a first insulating layer 24 is formed on a bottom plate 20, and a data line 25 is formed on a predetermined portion of the first insulating layer 24 in a direction. Further, a protective layer 26 is formed over the entire surface of the plate to cover the data line 25, and a pixel electrode 27 is formed on the protective layer 26 to be spaced from the data line 25 by a predetermined distance. A BM 16 is formed on a top plate 15 to overlap the data line 25 and an edge portions of the pixel electrode 27 of the bottom plate.

As shown in FIG. 2b taken along line II—II of FIG. 1, the TFT-LCD includes a second insulating layer 22 covering an island shaped semiconductor layer formed on the bottom plate 20, a gate electrode 23 formed on a predetermined portion of the second insualting layer 22, a gate line 23a formed on a predetermined area of the semiconductor layer, source and drain regions 21a and 21b formed in the semicondutor layer at both sides of the gate line 23a, a third insulating layer 24 formed on the entire surface of the bottom plate 20 including the gate electrode 23, a data line formed on the third insulating layer 24 for contacting the source region 21a by crossing the third and second insulating layers, a fourth insulating layer 26 formed on the entire surface, a pixel electrode 27 contacting the drain regions 21b by crossing the fourth, third, and second insulating layers 26, 24, and 22, and spaced away from the gate electrode 23, and a fifth insulating layer 28 formed on the entire surface. The top plate 15 includes a black matrix 16 overlapping the data line and a portion of the pixel electrode 27.

The aforementioned conventional TFT-LCD and the fabricating method thereof have the following problems. First, a black matrix is placed in a data line, and thus an aperture ratio of the TFT-LCD is restrained and power consumption is increased. Second, since the TFT-LCD is driven in accordance with the line inversion method, vertical crosstalk may be generated.

SUMMERY OF THE INVENTION

Therefore, the present invention is directed to a TFT-LCD and a fabricating method thereof that substantially obviate one or more of problems due to limitations and disadvantages of the related art.

An object of the present invention is to provide a TFT-LCD of which an aperture ratio is improved.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages an in accordance with the purpose of the present invention, as embodied and broadly described, a TFT-LCD includes data lines and gate lines which intersect with each other, a black matrix formed only above the gate line, and a pixel electrode extending to the edge of the data line.

In another aspect of the present invention, a TFT-LCD includes an insulating layer formed on a bottom plate, a data line formed on a predetermined area of the bottom plate, a protective layer formed on the bottom plate and on the data line, a pixel electrode formed on the protective layer along the data line, a top plate overlapping the data line of the bottom plate, a color filter layer formed on the top plate to overlap the data line, a common electrode formed on the color filter layer, and a polyimide (PI) layer formed on the common electrode.

It is to be understood that both the foregoing general description and the following detailed description are exemplary and explanatory and are intended to provide further explanation of the invention is as claimed.

BRIEF DESCRIPTION OF THE DRAWINGS

These and various other objects, features, and advantages of the present invention will be readily understood with reference to the following detailed description read in conjunction with the accompanying drawings, in which.

DETAILED DESCRIPTION OF THE PREFERRED EMBODIMENTS

Figure 1:
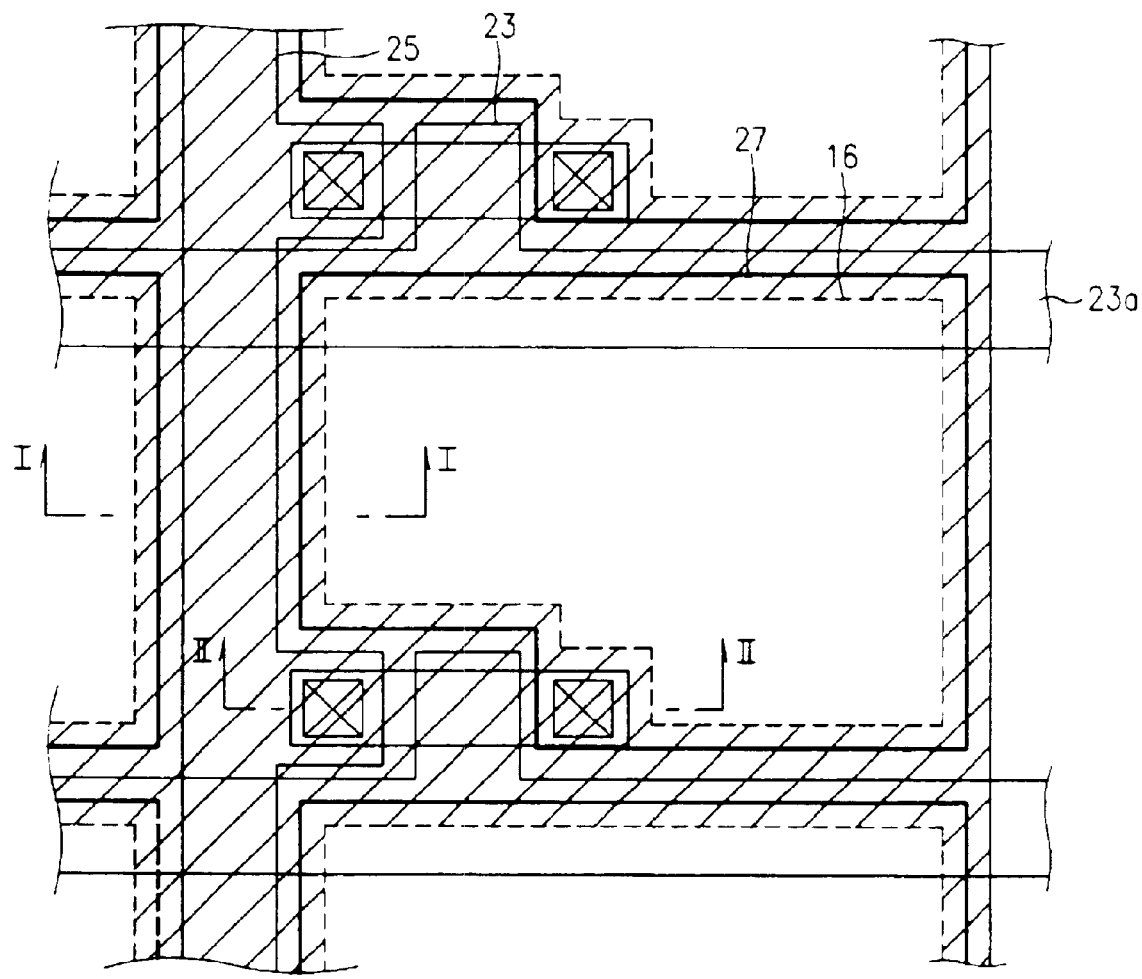
FIG. 1 is a plan view of a conventional TFT-LCD.
Figure 2A:
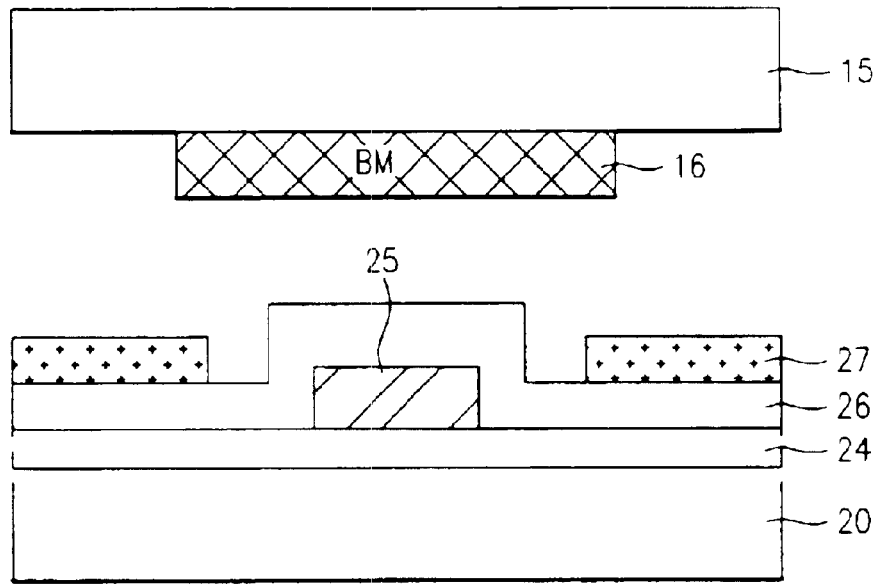
FIG. 2a is a cross-sectional view of the conventional TFT-LCD, taken along line I—I of FIG. 1.
Figure 2B:
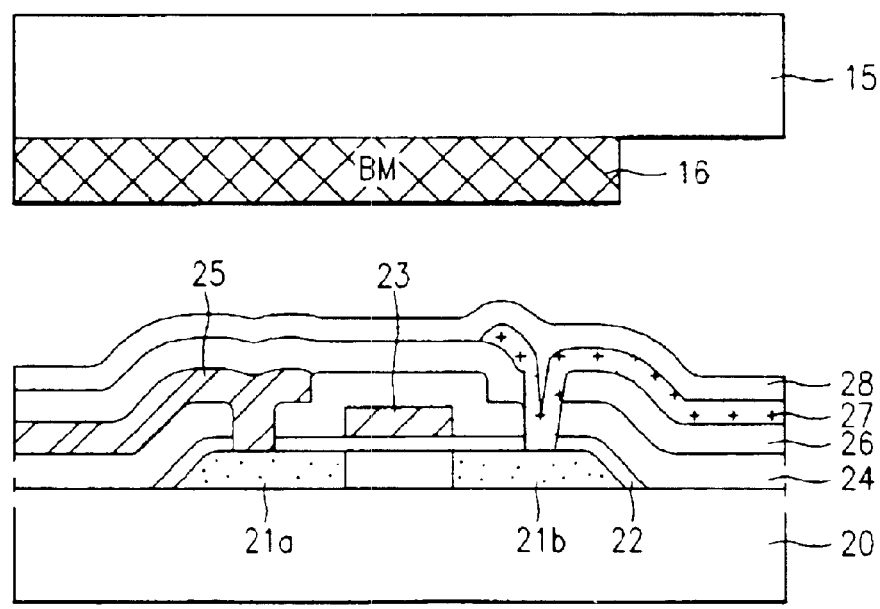
FIG. 2b is a cross-sectional view of the conventional TFT-LCD, taken along line II—II of FIG. 1.

Reference will now be made in detail to the preferred embodiments of the present invention, examples of which are illustrated in the accompanying drawings. Wherever possible, the same reference characters are used to label like or similar structures throughout the drawings.

Figure 3:
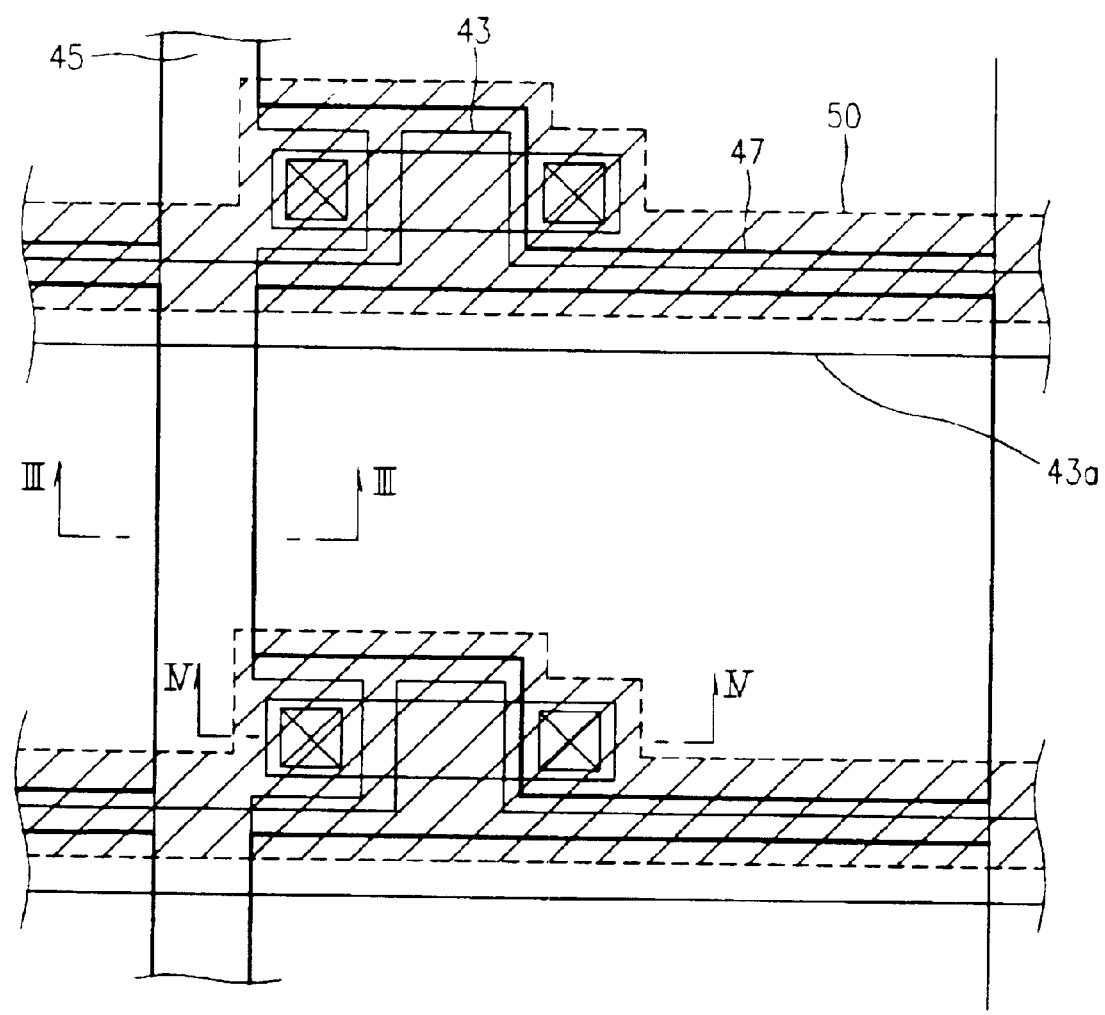
FIG. 3 is a plan view of a TFT-LCD in accordance with a first embodiment of the present invention.
Figure 4:
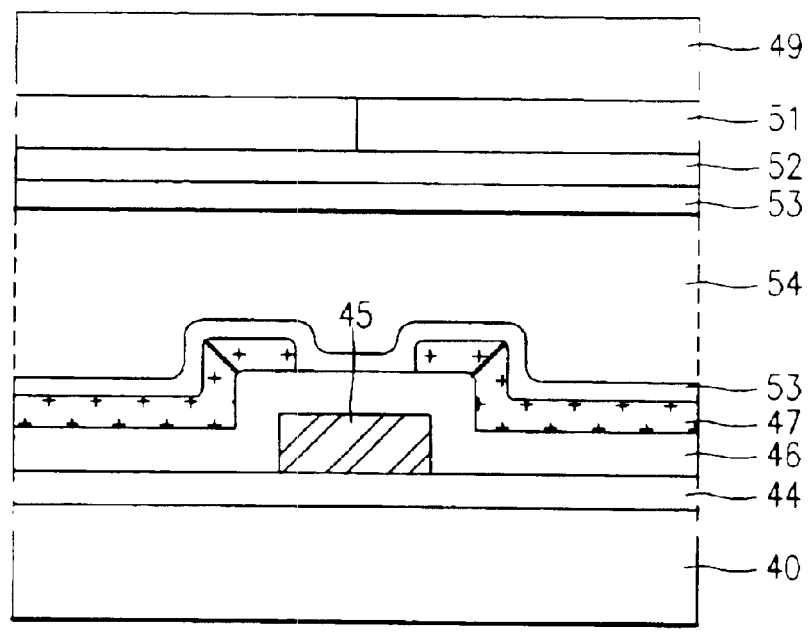
FIG. 4 is a cross-sectional view of the TFT-LCD in accordance with the first embodiment of the present invention, taken along line III—III of FIG. 3.
Figure 5:
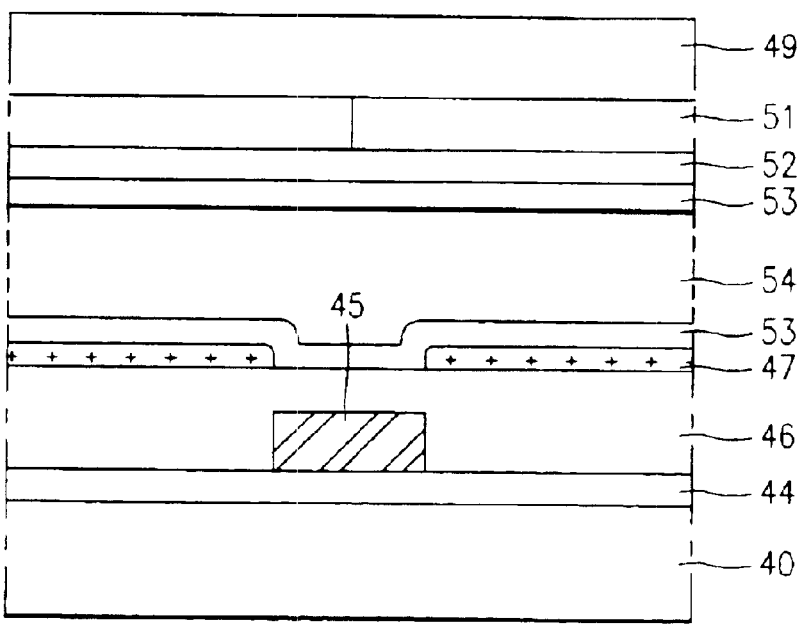
FIG. 5 is a cross-sectional view of a TFT-LCD in accordance with a second embodiment of the present invention, taken along line III—III of FIG. 3.
Figure 6:
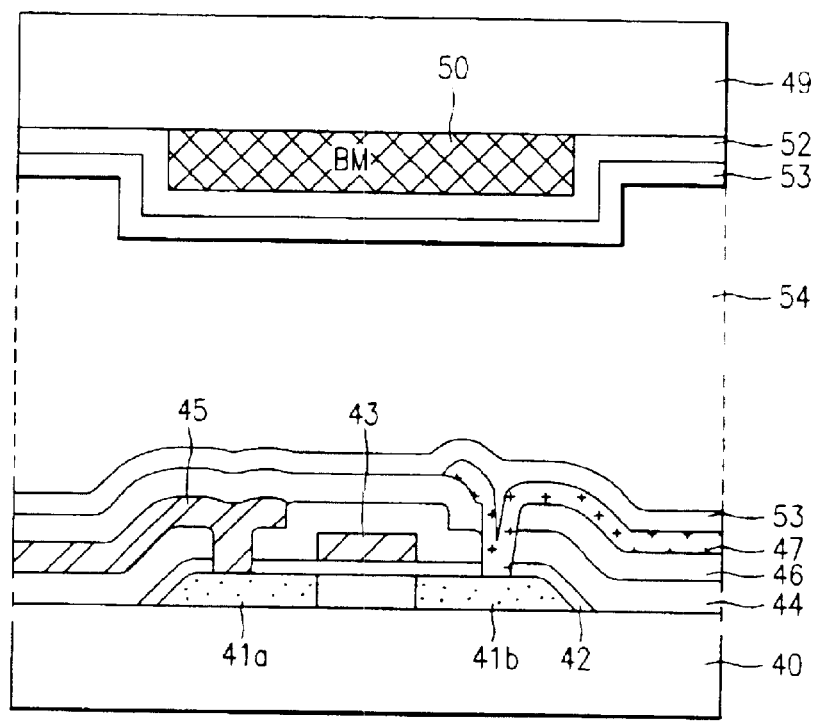
FIG. 6 is a cross-sectional view showing the structure of the TFT-LCD, taken along line IV—IV of FIG. 3.

FIG. 3 is a plan view of a TFT-LCD according to present invention, and FIG. 4 is a cross-sectional view of showing the structure of the TFT-LCD, taken along line III—III of FIG. 3, according to the first embodiment of the invention, FIG. 5 is a cross-sectional view of the TFT-LCD taken along line III—III of FIG. 3 according to the second embodiment of the invention, and FIG. 6 is a cross-sectional view of the TFT-LCD, taken along line IV—IV.

As shown in FIGS. 3 and 4, edge portions of a pixel electrode 47 overlap a data line 45. A black matrix (BM) 50 is selectively formed on active regions, a gate electrode 43, and a gate line 43. The BM 50 is not formed along the data line 45. Accordingly, an aperture ratio of the TFT-LCD is increased to reduce power consumption while its luminance is maintained.

An interlayer insulating layer 44 is formed on a bottom plate 40, on which the data line 45 is formed. A protective layer 46 made of an inorganic insulating material is formed on the entire surface. There is a tapered pixel electrode 47 made of indium tin oxide (ITO) on the protective layer 46 for overlapping both edges of the data line 45.

The tapered portion of the pixel electrode 47 has a slant angle of more than 70°. The pixel electrode 47 overlaps the data line 45 and the overlapped portions of the pixel electrode 47 are automatically separated from the pixel electrode 47. A protective layer 46 is formed between the pixel electrode 47 and the data line 45. A color filter layer 51 is formed on the top plate 49 overlapping the data line 45 on the bottom plate 40. The color filter layer 51 is divided into two at the center of the data line 45. A common electrode 52 made of ITO is formed on the color filter layer 51. A PI layer 53 is formed on the surface of the common electrode 52 for arranging liquid crystal molecules in a specific direction. A crystal liquid material 54 is injected between the top plate 49 and the bottom plate 40.

As shown in FIGS. 3 and 5 showing the structure of the TFT-LCD according to the second embodiment of the present invention, taken along line III—III of FIG. 3, an interlayer insulating layer 44 is formed on the bottom plate 40. A data line 45 is formed on a predetermined area of the interlayer insulating layer 44. A protective layer 46, made of an inorganic insulative material or an organic insulative material, is formed to be planarized horizontally. A pixel electrode 47 is formed on the protective layer 46 but not formed over the data line 45. A color filter layer 51 is formed on the top plate 49 overlapping the data line 45 over the bottom plate 40. A common electrode 52 made of ITO is formed on the color filter layer 51. A PI layer 53 is formed on the common electrode 52 for arranging liquid crystal molecules in a specific direction. At this time, the color filter is divided into two at the center of the data line 45. A liquid crystal material 54 is injected to between the top plate 49 and the bottom plate 40.

As shown in FIG. 6 taken along line IV—IV of FIG. 3, the TFT-LCD includes an island-shaped semiconductor layer in which source and drain regions 41a and 41b are formed on a bottom plate 40, a gate insulating layer 42 covering the semiconductor layer, a gate electrode 43 formed on a predetermined area of the gate insulating layer 42, an interlayer insulating layer 44 formed on entire surface of the bottom plate 40 including the gate electrode 43, a data line 45 spaced apart from the gate electrode 43 and contacting with the source region 41a by crossing the interlayer insulating layer 44, a protective layer 46 formed on the entire surface, a pixel electrode 47 spaced apart from the gate electrode 43 and contacting with drain region 41b by crossing the gate insulating layer 42, and a PI layer 53 formed on the pixel electrode 47 for arranging liquid crystal molecules in a specific direction.

A top plate 49 includes a black matrix 50 which is formed thereon to overlap a predetermined portion of the pixel electrode 47 and a predetermined portion of the data line 45. The common electrode 52 is formed on the black matrix 50. The PI layer 53 is formed on the common electrode 52 for arranging liquid crystal molecules in a specific direction.

A method for fabricating the TFT-LCD having the aforementioned structure according to the first embodiment of the present invention will be described below with reference to the accompanying drawings.

Figure 7A:
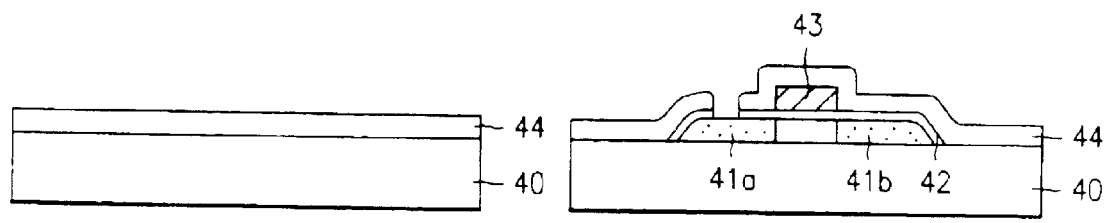
FIGS. 7a to 7c are cross-sectional views of process steps of a method for fabricating a bottom plate of the TFT-LCD in accordance with the first embodiment of the present invention, taken along line III—III of FIG. 3.
Figure 7B:
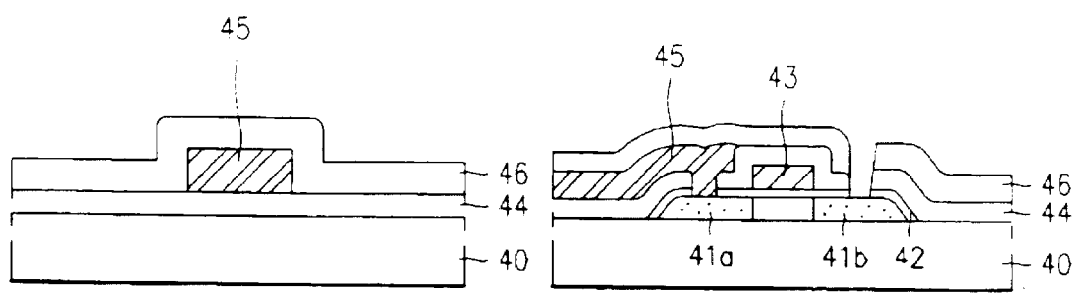
Figure 7C:
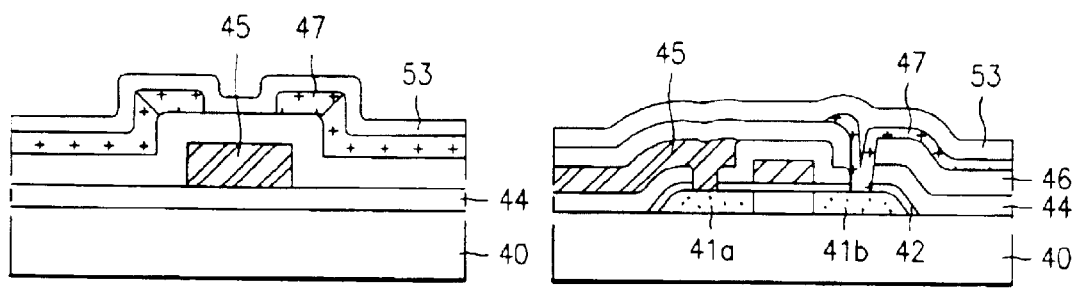
Figure 8A:
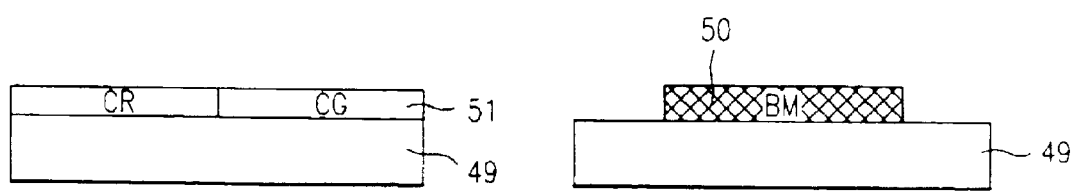
FIGS. 8a and 8b are cross-sectional views of process steps of a method for fabricating a top plate of the TFT-LCD of the TFT-LCD in accordance with the first embodiment of the present invention, taken along line III—III of FIG. 3.
Figure 8B:
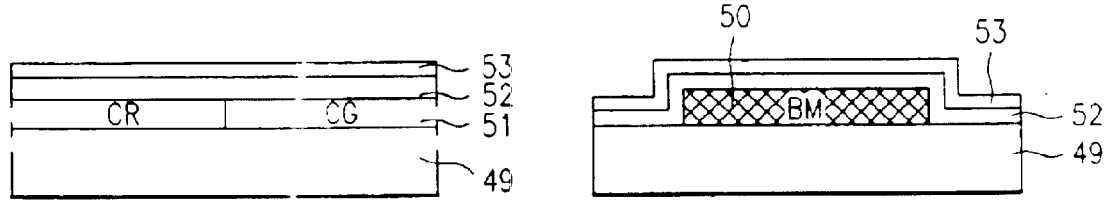
Figure 9:
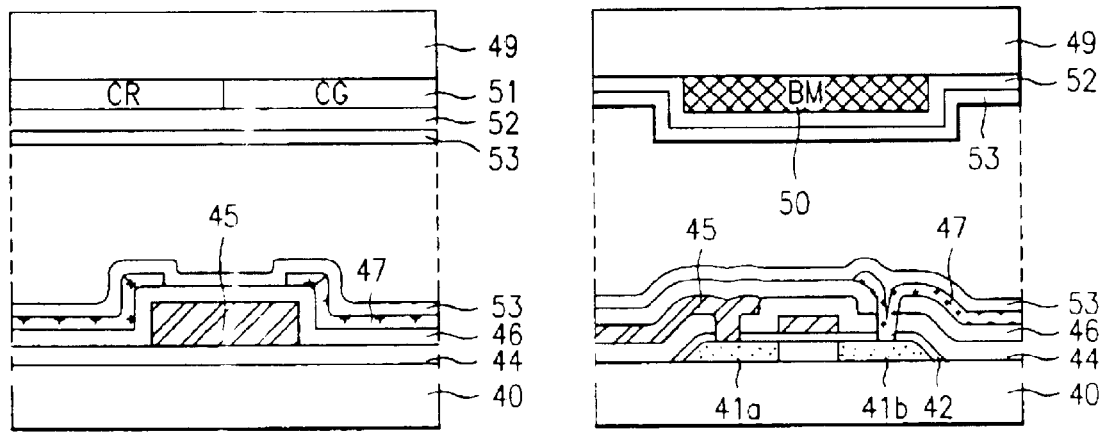
FIG. 9 is a cross-sectional view of the structure of the TFT-LCD after uniting the bottom plate and the top plate in accordance with the first embodiment of the present invention.

FIGS. 7a to 7c are cross-sectional views showing process steps of a method for fabricating the bottom plate of the TFT-LCD according to the first embodiment of the present invention, FIGS. 8a and 8b are cross-sectional views showing process steps of a method for fabricating the top plate of the TFT-LCD according the first embodiment, and FIG. 9 is a cross-sectional view showing the structure of the TFT-LCD after uniting the top plate and the bottom plate according to the first embodiment of the present invention.

As shown in FIG. 7a, a polysilicon layer is formed on an insulating bottom plate 40 made of, e.g., glass. A photolithography process and a photo etching process are applied to the polysilicon layer to form an island-shaped semiconductor layer. Subsequently, a gate insulating layer 42 made of an oxide is formed to cover the semiconductor layer. Next, a conductive layer for a gate electrode is deposited on the entire surface and selectively removed by a photolithography process and a photo etching process so that a gate electrode 43 is formed in a direction on the gate insulating layer 42. Using the gate electrode mask, impurity ions are implanted into the entire surface of the bottom plate 40 to form source and drain regions 41a and 41b over the semiconductor layer au both sides of the gate electrode 43. Then, an interlayer insulating layer 44 is deposited on the entire surface and selectively removed by a photolithography process and a photo etching process until the source region 41a is exposed to form a first contact hole.

As shown in FIG. 7b, a data line 45 is formed on a predetermined area of the interlayer insulating layer 44 and in the first contact hole. Subsequently, a protective layer 46 is formed on the entire surface including the data line 45, and then the protective layer 46, the interlayer insulating layer 44, and the gate insulating layer 42 are selectively removed by a photolithography process and a photo etching process until a predetermined area of the drain region 41b is exposed to form a second contact hole. At this time, the data line 45 is at right angle to the gate line 43a (see FIG. 3). The protective layer 46 may be formed to be planarized horizontally.

As shown in FIG. 7c, a pixel electrode 47 is formed in the second contact hole and on a predetermined area of the protective layer 46 adjoining to the second contact hole. At this time, the pixel electrode 45 is formed along the data line 45 and covers the drain region 41b. A PI layer 53 is formed on the entire surface.

A method for fabricating the top plate 49 of the TFT-LCD according to the first embodiment of the present invention will be described in detail below.

As shown in FIG. 8a, a BM 50 is formed on a predetermined area of the top plate 49. The BM 50, formed in the same direction a of the gate line 43a shields the gate line 43a and the source and drain regions 41a and 41b from light. A color filter layer 51 of cyan red (CR) and cyan green (CG) for producing colors is formed on the top plate 49. This color filter layer 51 is divided into CR and CG at the center of the data line 45.

As shown in FIG. 8b, a common electrode 52 made of ITO is formed on the entire surface including the BM 50 and the color filter layer 51. A PI layer 53 is formed on the common electrode 52 for arranging liquid crystal molecules in a specific direction.

As shown in FIG. 9, the top plate 49 and the bottom plate 40 are united to have a predetermined gap between the two plates 49 and 40, and then a liquid crystal material 54 is injected into the gap, thereby completing the process steps of the method for fabricating the TFT-LCD according to the first embodiment of the present invention.

Figure 10:
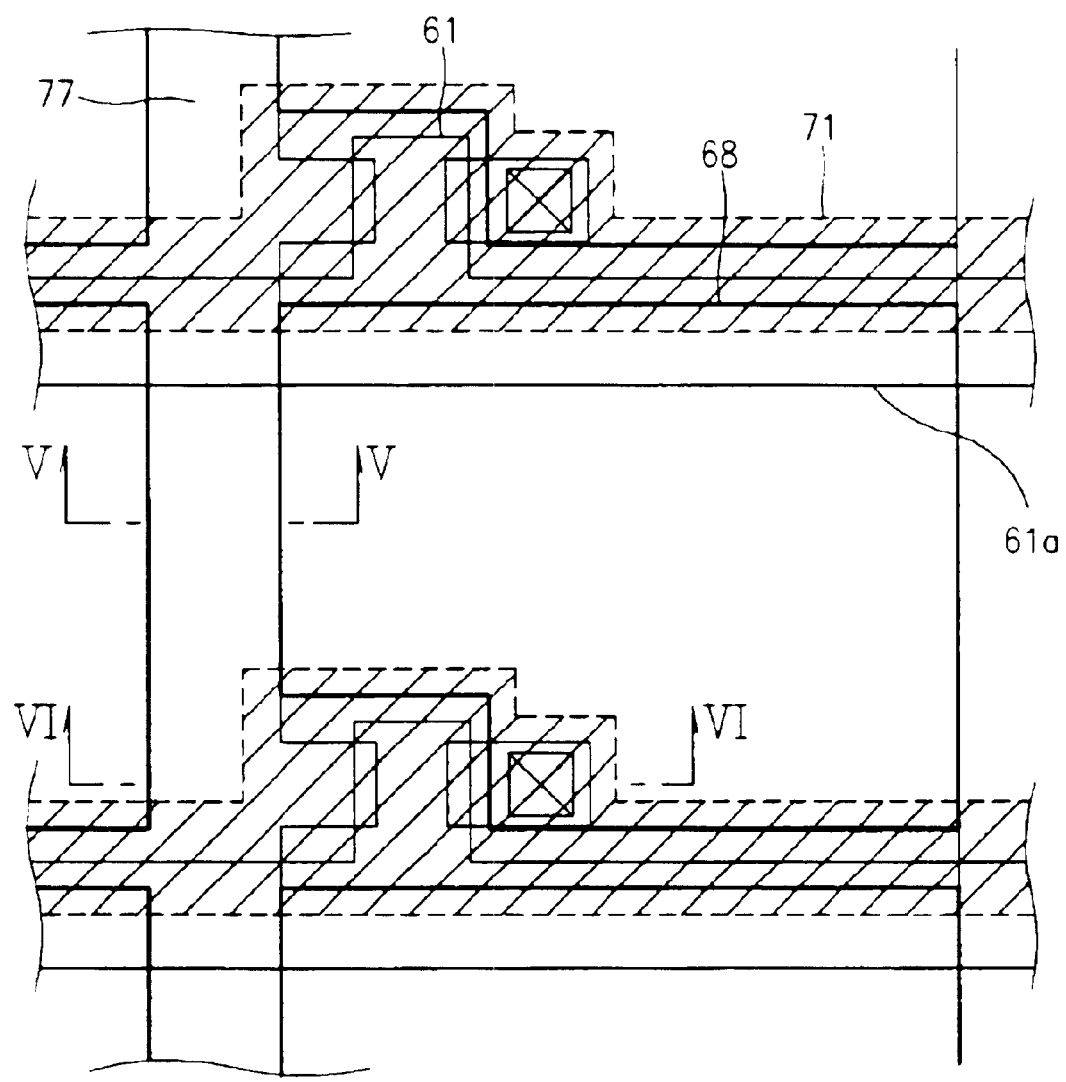
FIG. 10 is a plan view of a TFT-LCD in accordance with a third embodiment of the present invention.
Figure 11A:
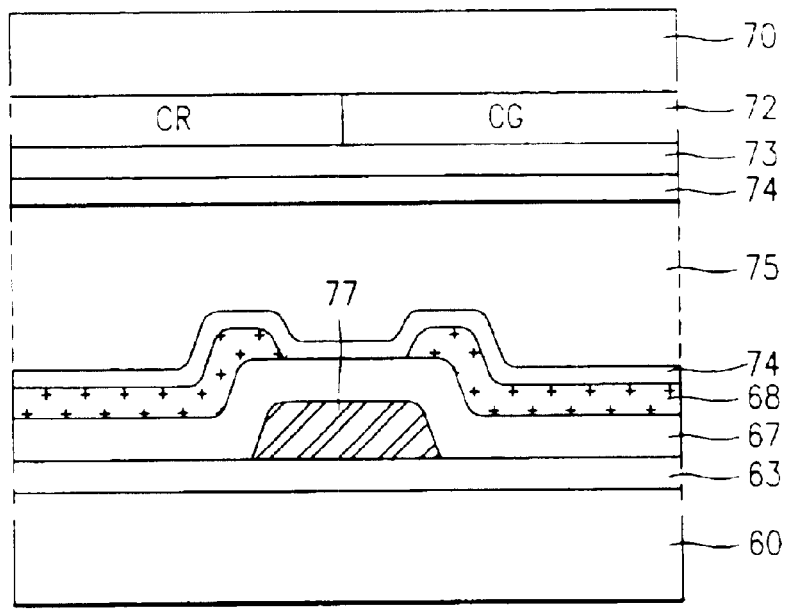
FIG. 11a is a cross-sectional view of the TFT-LCD in accordance with the third embodiment of the present invention, taken along line V—V of FIG. 10.
Figure 11B:
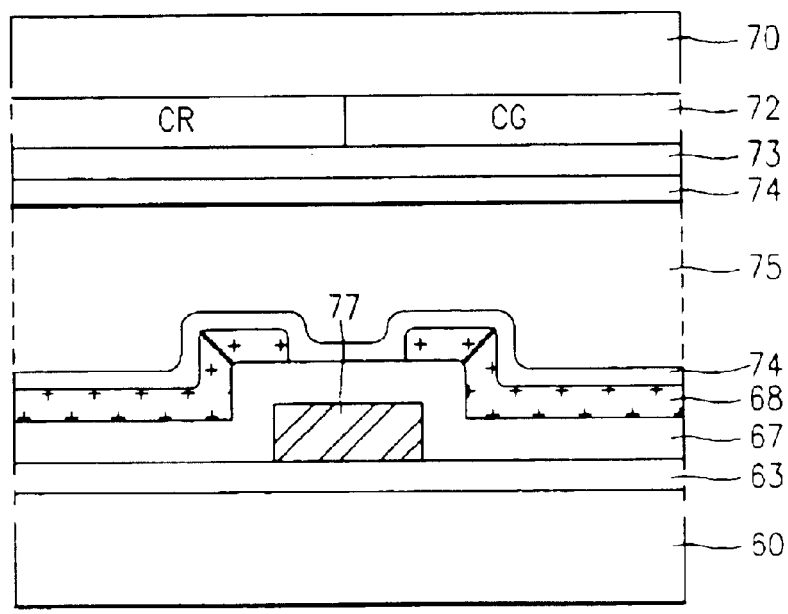
FIG. 11b is a cross-sectional view of a TFT-LCD in accordance with a fourth embodiment of the present invention, taken along line V—V of FIG. 10.
Figure 11C:
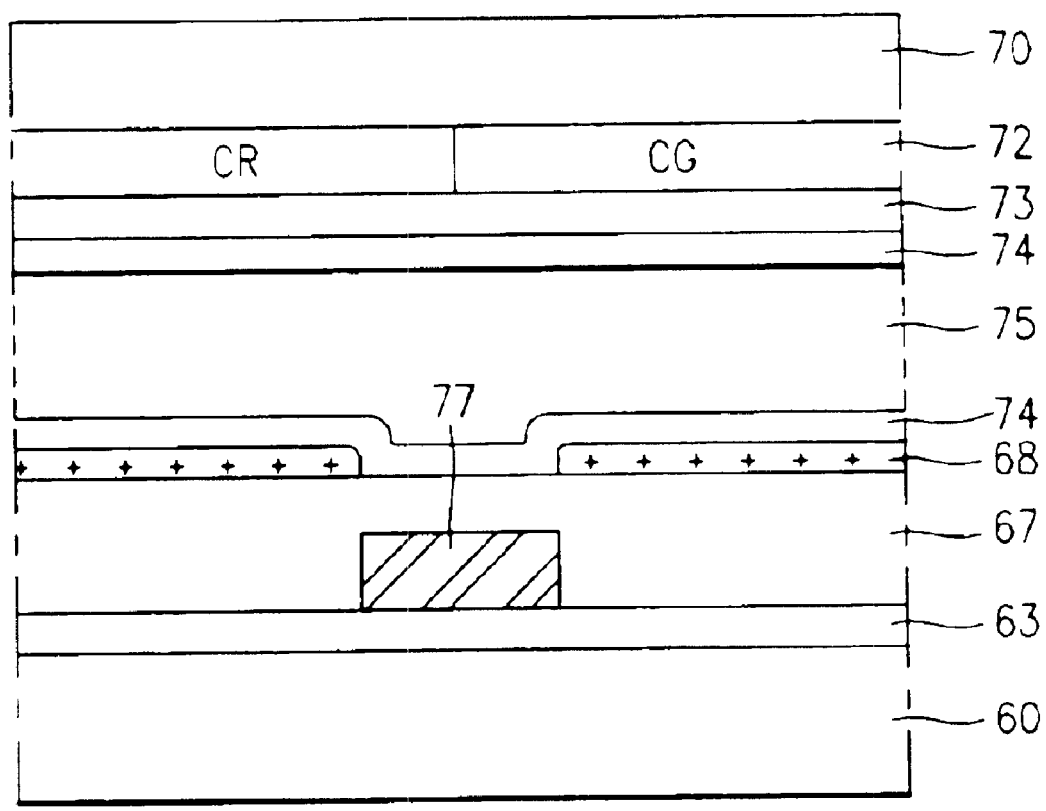
FIG. 11c is a cross-sectional view of a TFT-LCD in accordance with a fifth embodiment of the present invention, taken along line V—V of FIG. 10.
Figure 12:
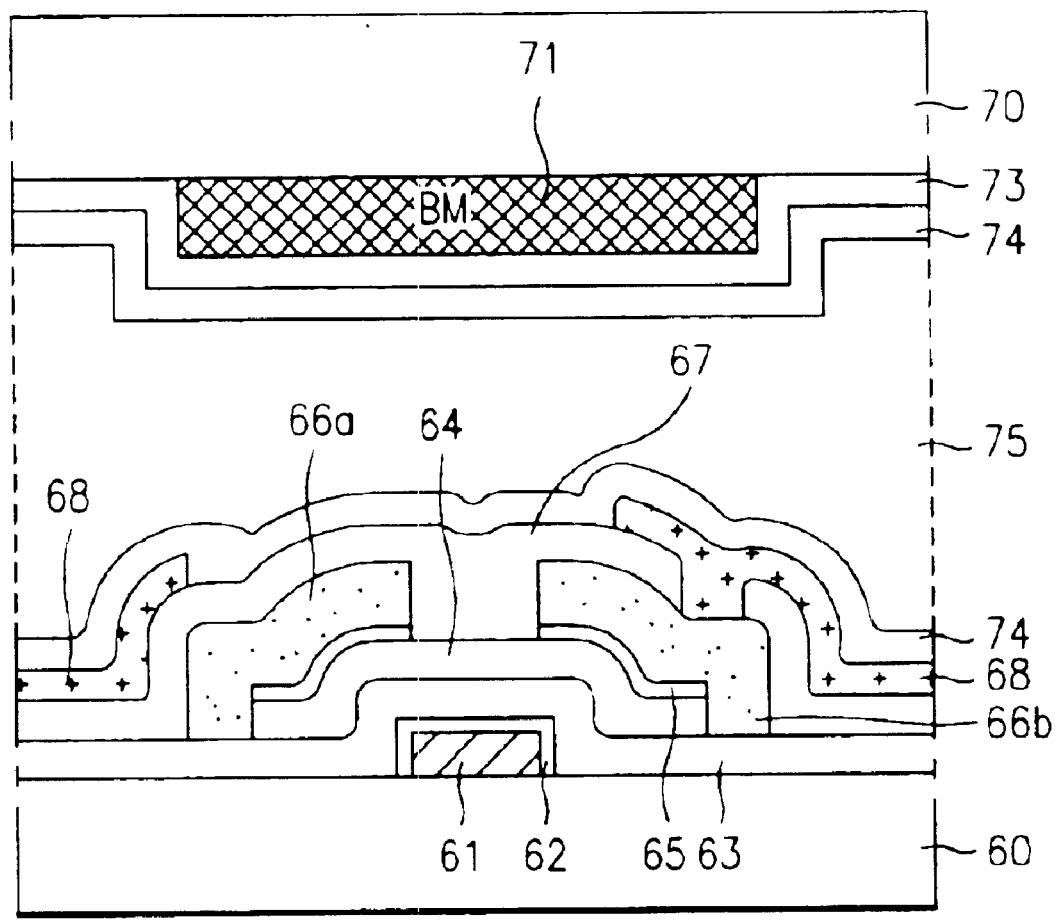
FIG. 12 is a cross-sectional view of the TFT-LCD in accordance with the third embodiment of the present invention, taken along line VI—VI of FIG. 10.

FIG. 10 is a plan view of a TFT-LCD according to the third embodiment of the present invention, FIG. 11 is a cross-sectional view of the TFT-LCD, taken along line V—V of FIG. 7, and FIG. 12 is a cross-sectional view of the TFT-LCD, taken along line VI—VI of FIG. 10.

As shown in FIG. 10, the TFT-LCD according to the third embodiment of the present invention is an inverted stagger type. A data line 77 overlaps the gate line 61a and a gate electrode 61 extending from the gate line 61a. The data line 77 is patterned to be divided to be left on both sides of the gate electrode 61. At this time, a portion protruding from the data line 77 is used as a source region. A portion opposite to the source region is used as a drain region. The pixel electrode 68 partially overlaps the data line 77. The BM 71 is selectively formed along the gate electrode 61, the gate line 61a, and an active region. At this time, an aperture ratio of the TFT-LCD is increased to reduce power consumption while its luminance is maintained.

As shown in FIG. 11 taken along line V—V of FIG. 10, the TFT-LCD of the invention includes a gate insulating layer 63 on a bottom plate, a data line 77 tapered on a predetermined area of the gate insulating layer 63, a protective layer 67 made of an inorganic insulative material, and a pixel electrode 68 made of ITO tapered on the protective layer 67 to overlap the data line 77.

A color filter layer 72 is formed on the top plate 70 which overlaps the data line 77 formed over the bottom plate 60. A common electrode 73 made of ITO is formed on the color filter layer 72. A PI layer 74 is formed on the common electrode 73 for arranging liquid crystal molecules in a specific direction. A liquid crystal material 75 is injected between the top plate 70 and the bottom plate 60. The color filter layer 72 is divided into two at the center of the data line 77.

As shown in FIGS. 10 and 11b, taken along line V—V of FIG. 10, showing a TFT-LCD according to the fourth embodiment, end portions of the pixel electrode 68 overlap the data line 77. The BM 71 is not formed alone the data line 77 but selectively formed on gate electrode 61, and the gate line 61a, and the active region. Accordingly, an aperture ratio of the TFT-LCD is increased to reduce power consumption while its luminance is maintained.

An interlayer insulating layer 63 is formed on a bottom plate 60, a data line 77 is formed on a predetermined area of the interlayer insualting layer 63, and a protective layer 67 made of an inorganic insulative material is formed on the entire surface. A pixel electrode 68 made of ITO is tapered on the protective layer 67 to overlap end portions of the data line 77. At this time, the tapered portions of the pixel electrode 68 have a slant angle of more than 70°. The pixel electrode 68 is tapered over the data line 77. The tapered portions of the pixel electrode 68 are automatically separated from the pixel electrode 68.

A color filter layer 72 is formed on a top plate 70 which overlaps the data line 77 formed over the bottom plate. A common electrode 73 made of ITO is formed on the color filter layer 72. A PI layer 74 is formed on the common electrode 73 for arranging liquid crystal molecules in a specific direction. The color filter layer 72 is divided into two at the center of the data line 77. A liquid crystal material 75 is injected between the top plate 70 and the bottom plate 60.

As shown in FIG. 11c taken along FIG. 10, the TFT-LCD according to the fifth embodiment of the present invention includes an interlayer insulating layer 63 formed on a bottom plate 60, a data line 77 formed on a predetermined area of the interlayer insulating layer 63, a protective layer 67 made of either an inorganic insulating material or an organic insulating material for being planarized horizontally; and a pixel electrode 68 formed on the protective layer 67 but not over the data line 77.

Also, a color filter layer 72 is formed on a top plate 70 which overlaps the data line 77 including the bottom plate 60. A common electrode 73 made of ITO is formed on the color filter layer 72. A PI layer 74 is formed on the surface of the common electrode 73 for arranging liquid crystal molecules in a specific direction. At this time, the color filter layer 72 is divided into two at the center of the data line 77. A liquid crystal material 75 is injected between the top plate 70 and the bottom plate 60.

As shown in FIG. 12 which shows the TFT-LCD according to the third embodiment of the present invention, a gate electrode 61 is formed on a predetermined area of a bottom plate 60. A bipolar oxide layer 62 surrounds the gate electrode 61. A gate insulating layer 63 is formed on the bottom plate 60 including the bipolar oxide layer 62. A semiconductor layer 64 made of amorphous silicon is formed on a predetermined area of the gate insulating layer 63 opposite to the gate electrode 61. A doped semiconductor layer 65 is formed on the semiconductor layer 64 except at a center portion of the semiconductor layer 64. Source and drain electrodes 66a and 66b are formed at both sides of the doped semiconductor layer 65 and the semiconductor layer 64 and on the doped semiconductor layer 65. A protective layer 67 is formed on the entire surface to have a contact hole which contacts the drain electrode 66b and a pixel electrode 68 which is formed on the protective layer 67. The source and drain electrodes 66a and 66b are made of an identical material with that for the data line 77.

A BM 71 is formed on a top plate 70 to overlap a portion of the gate electrode 61 and the pixel electrode 68. A common electrode 73 is formed on the black matrix 71. A PI layer 74 is formed on the entire surface including the common electrode 73.

A method for fabricating the TFT-LCD according to the third embodiment of the present invention will be described with reference to the accompanying drawings.

Figure 13A:
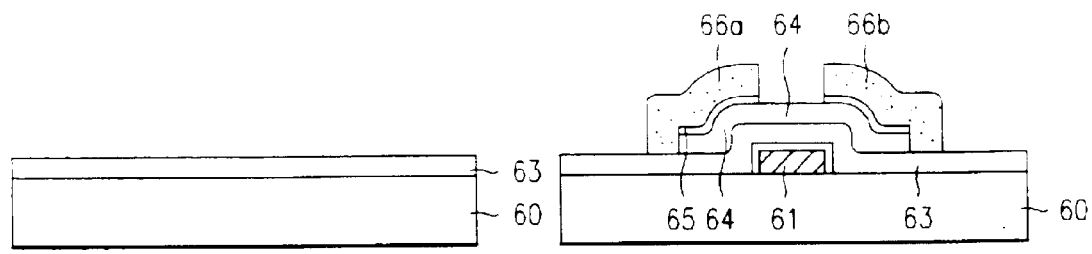
FIGS. 13a and 13b are cross-sectional views showing process steps of a method for fabricating a bottom plate of the TFT-LCD in accordance with the third embodiment of the present invention, taken along line V—V of FIG. 10.
Figure 13B:
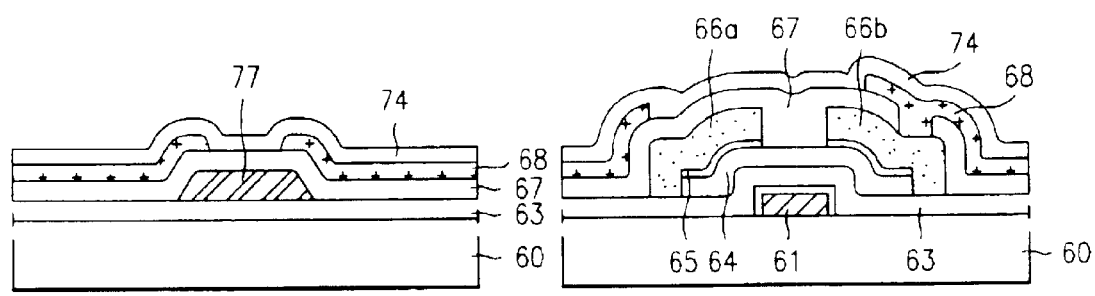
Figure 14A:
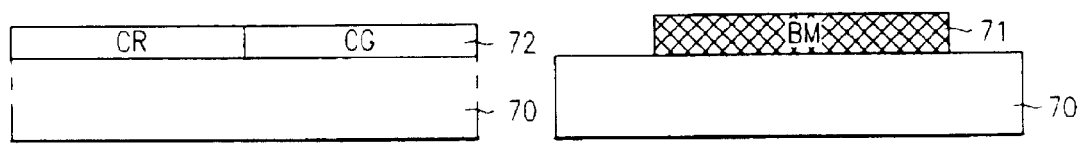
FIGS. 14a and 14b are cross-sectional views showing process steps of a method for fabricating a top plate of the TFT-LCD in accordance with the third embodiment of the present invention, taken along line V—V of FIG. 10.
Figure 14B:
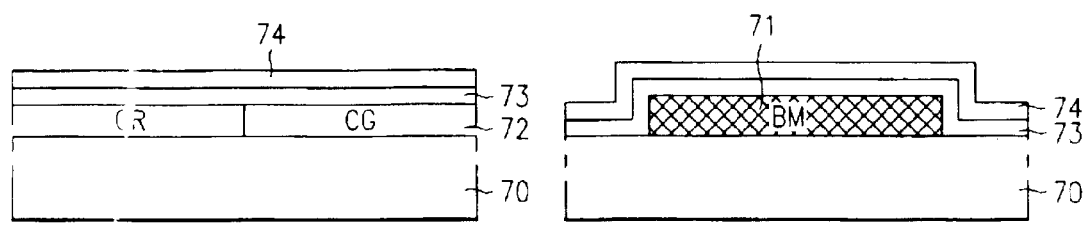
Figure 15:
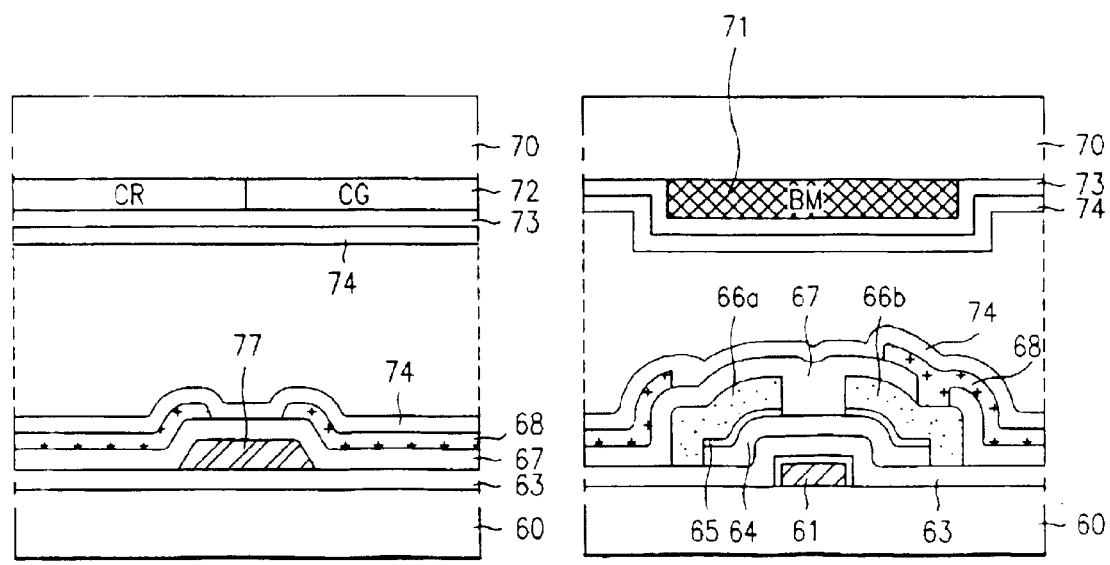
FIG. 15 is a cross-sectional view showing the structure of the TFT-LCD after uniting the bottom plate and the top plate in accordance with the third embodiment of the present invention.

FIGS. 13a and 13b are cross-sectional views showing process steps of a method for fabricating a bottom plate of the TFT-LCD, taken along line V—V of FIG. 10, FIGS. 14a and 14b are cross-sectional views showing process steps of a method for fabricating a top plate of the TFT-LCD, taken along line V—V of FIG. 10, and FIG. 15 is a cross-sectional view showing the structure of the TFT-LCD after uniting the top plate and the bottom plate.

As shown in FIG. 13a, a gate line 61a having a protruding portion is formed in a direction on a bottom plate. At this time, the protruding portion is a gate electrode 61. A bipolar oxide layer 62 is formed on the entire surface of the gate electrode 61. A semiconductor layer 64 made of amorphous silicon and a doped amorphous silicon layer are successively formed on the entire surface and patterned to remain over the gate electrode 61 and adjoining area to the gate electrode 61, thus forming a doped semiconductor layer 65 and the semiconductor layer 64. Next, a conductive layer is deposited and patterned by a photolithography process ard a photo etching process so that source and drain electrodes 66a and 66b are formed on the doped 9 semiconductor layer 65 and on both sides of the semiconductor layer 64 and the doped semiconductor layer 65. At this time, the doped semiconductor layer 65 is removed over the gate electrode 61.

As shown in FIG. 13b, after forming the conductive layer on the entire surface, a data line 77 is formed at right angle to the gate line 61a (see FIG. 10). The data line 77 is of a trapezoid form in which the top side of the data line 77 is shorter than the bottom side of the data line 77. Subsequently, a protective layer 67 is deposited on the entire surface and patterned to form a contact hole until a predetermined area of the drain electrode 66b is exposed. Next, an ITO layer is deposited on the entire surface and patterned by a photolithography process and a photo etching process to form a pixel electrode 68 in the contact hole and on a predetermined area of the protective layer 67 adjoining to the contact hole. This pixel electrode 68 is formed along the data line 77 and overlaps the drain electrode 66b. Next, a PI layer 74 is formed on the entire surface or arranging liquid crystal molecules in a specific direction.

A method for fabricating a top plate of the TFT-LCD according to the third embodiment will be described with reference to the accompanying drawings.

As shown in FIG. 14a, a BM layer 71 is formed on a top plate 70 for shielding the gate electrode 61 and the source and drain electrodes 66a and 66b from light. Then, a color filter layer 72 of CR and CG is formed on the top plate for producing colors. This color filter layer 72 is divided into the CR and the CG at the center of the data line 77.

As shown in FIG. 14b, a common electrode 73 made of ITO is formed on the entire surface of the black matrix 71 and the color filter layer 72, and then a PI layer 74 is formed on the common electrode 73 for arranging liquid crystal molecules in a specific direction.

As shown in FIG. 15, the top plate 70 and the bottom plate 60 are united to have a predetermined gap between the plates 70 and 60. Then, a liquid crystal material 75 is injected between the top plate 70 and the bottom plate 60, thus completing the process steps of fabricating the TFT-LCD according to the third embodiment of the present invention.

The TFT-LCD of the invention is fabricated using a dot-inversion method and a column inversion method. In the dot inversion method in which a line inversion method and a column inversion method are united, polarizations of pixels which are adjacent to one another vertically and horizontally become reverse so that crosstalks generated in pixels in vertical and horizontal directions offset one another.

The TFT-LCD of the present invention and the method for fabricating the same have the following advantages. First, the edge of a pixel electrode extends to the edge of a data line, and a BM is formed along a gate line, but not along the data line, thereby increasing an aperture ratio at a same luminance. Second, as the aperture ratio is increased at a same luminance, power consumption is reduced.

It will be apparent to those skilled in the art that various modification and variations can be made in the TFT-LCD and the fabricating method thereof of the present invention without departing from the spirit or scope of the inventions. Thus, it is intended that the present invention cover the modifications and variations of this invention provided they come within the scope of the appended claims and their equivalents.

What is claimed is:

1. A method for fabricating a TFT-LCD, comprising the steps of:

preparing a bottom plate and a top plate such that the plates face each other;

forming an insulating layer on the bottom plate;

forming a data line on predetermined areas of the insulating layer;

forming a protective layer on the data line and the insulating layer;

forming a pixel electrode on the protective layer so that first and second edge portions of the pixel electrode are respectively aligned with an edge of the data line and an edge of a next data line adjacent to the data line;

forming a color filter layer on the top plate; and forming a common electrode on the color filter layer.

2. The method for fabricating a TFT-LCD as claimed in claim 1, further comprising the step of:

forming a black matrix layer on the top plate over a gate line and a thin film transistor except a portion of the data line not overlapping with the gate line.

3. A method for fabricating a TFT-LCD, comprising the steps of:

preparing a bottom plate and a top plate such that the plates face each other;

forming an insulating layer on the bottom plate;

forming a data line on a predetermined area of the insulating layer, wherein the data line has a tapered portion;

forming a protective layer on the data line and the insulating layer;

forming a pixel electrode on the protective layer so that the pixel electrode overlaps the data line, wherein the portion of the pixel electrode that overlaps the data line has a tapered portion;

forming a color filter layer on the top plate; and forming a common electrode on the color filter layer.

4. The method for fabricating a TFT-LCD as claimed in claim 3, further, comprising the steps of:

forming a first orientation layer on the pixel electrode and the protective layer; and forming a second orientation layer on the common electrode.

5. The method for fabricating a TFT-LCD as claimed in claim 3, wherein an upper surface of the protective layer is planar.

6. The method for fabricating a TFT-LCD as claimed in claim 3, wherein the pixel electrode overlaps edge portions of the data line, the portion of the pixel electrode that overlaps the edge portions of the data line has an angle of less than 90 degrees with respect to a horizontal surface of the protective layer or the data line.

7. The method for fabricating a TFT-LCD as claimed in claim 3, wherein the protective layer is made from one of an inorganic insulating material or an organic insulating material.

8. The method for fabricating a TFT-LCD as claimed in claim 3, wherein the color filter layer is divided at a center of the data line.

9. The method for fabricating a TFT-LCD as claimed in claim 3, wherein the pixel electrode is formed so that the pixel electrode overlaps the edge portions of the data line.

10. The method for fabricating a TFT-LCD as claimed in claim 3, wherein the protective layer has a similar roughness as the data line.

11. The method of fabricating a TFT-LCD as claimed in claim 3, further comprising the step of:

forming a black matrix layer on the top plate over a gate line and a thin film transistor except a portion of the data line not overlapping with the gate line.

12. The method for fabricating a TFT-LCD as claimed in claim 3, wherein the portion of the pixel electrode that overlaps the data line is separated from the pixel electrode.

* * * * *